(12) United States Patent
Ishii

(10) Patent No.: US 11,499,045 B2
(45) Date of Patent: Nov. 15, 2022

(54) COMPOUND RESIN AND HUMAN BODY MODEL

(71) Applicant: KURARAY TRADING CO., LTD., Osaka (JP)

(72) Inventor: Masaru Ishii, Osaka (JP)

(73) Assignee: KURARAY TRADING CO., LTD., Osaka (JP)

(*) Notice: Subject to any disclaimer, the term of this patent is extended or adjusted under 35 U.S.C. 154(b) by 749 days.

(21) Appl. No.: 16/463,913

(22) PCT Filed: Nov. 28, 2017

(86) PCT No.: PCT/JP2017/042604
§ 371 (c)(1),
(2) Date: May 24, 2019

(87) PCT Pub. No.: WO2018/097311
PCT Pub. Date: May 31, 2018

(65) Prior Publication Data
US 2019/0390054 A1    Dec. 26, 2019

(30) Foreign Application Priority Data
Nov. 28, 2016  (JP) .............. JP2016-230268

(51) Int. Cl.
*C08L 53/02*   (2006.01)
*C08L 91/00*   (2006.01)
*G09B 23/30*   (2006.01)

(52) U.S. Cl.
CPC ............ *C08L 53/025* (2013.01); *C08L 91/00* (2013.01); *G09B 23/30* (2013.01)

(58) Field of Classification Search
CPC .. G09B 23/285; G09B 23/286; G09B 23/288; G09B 23/30; C08L 53/025
See application file for complete search history.

(56) References Cited

U.S. PATENT DOCUMENTS

| 5,169,626 A * | 12/1992 | Tanner ................ A61K 8/31 424/68 |
| 2006/0276592 A1 | 12/2006 | Kanae et al. |
| 2007/0238835 A1* | 10/2007 | Chen ................ C08L 53/025 525/240 |
| 2014/0298886 A1 | 10/2014 | Nishi |
| 2015/0073087 A1 | 3/2015 | Ono |
| 2015/0183969 A1 | 7/2015 | Tanaka et al. |
| 2016/0225288 A1* | 8/2016 | East ................ A61B 17/1671 |
| 2016/0347914 A1* | 12/2016 | Overdulve ............ C08L 83/04 |
| 2019/0085146 A1* | 3/2019 | Chino ................ C08J 9/14 |

FOREIGN PATENT DOCUMENTS

| CN | 104411761 A | 3/2015 |
| CN | 105348820 A | 2/2016 |
| JP | 9-208836 A | 8/1997 |
| JP | 2003-235688 A | 8/2003 |
| JP | 2004-323603 A | 11/2004 |
| JP | 2004323552 A | 11/2004 |
| JP | 2004323553 A | 11/2004 |
| JP | 2004323598 A | 11/2004 |
| JP | 2008-63365 A | 3/2008 |
| JP | WO 2010/024382 A1 | 3/2010 |
| JP | 2012246402 A | 12/2012 |
| JP | 2013-194164 A | 9/2013 |
| JP | 2015-112270 A | 6/2015 |
| JP | 2015-160886 A | 9/2015 |
| JP | 2017-105990 A | 6/2017 |
| WO | WO 2013/077077 A1 | 5/2013 |
| WO | WO 2017/030145 A1 | 2/2017 |
| WO | WO 2017/047274 A1 | 3/2017 |

OTHER PUBLICATIONS

Kanayama et al., electronic translation of JP2003-235688, Aug. 2003.*
Tasaka, electronic translation of JP 2004-323603, Nov. 2004.*
Extended European Search Report dated Jun. 23, 2020 in Patent Application No. 17873604.7, 5 pages.
Office Action dated Mar. 10, 2020 in Singapore Patent Application No. 11201904674S, 8 pages.
"Décolleté Face Esthetic Practice Mannequin [mf 03]", Kirari Beauty, URL: https://web.archive.org/web/20150809011807/http://kiraribeauty.jp/manekin-f/mf03.html, 2015, (with English translation), 4 pages.
"Silicon Pad (2 Pieces (Dedicated Cover 4 Pieces Set)) Product Information", Dinos Cecile Co., Ltd., https://web.archive.org/web/20161021135716/http://www.cecile.co-jp/detail/BT-16/, 1999, (with English translation), 4 pages.
Chinese Office Action and Search Report dated Sep. 13, 2021 in Patent Application No. 201780073127.8, 6 pages (with English translation of Categories).
International Search Report dated Feb. 6, 2018 in PCT/JP2017/042604 filed on Nov. 28, 2017.

* cited by examiner

Primary Examiner — Jeffrey C Mullis
(74) Attorney, Agent, or Firm — Element IP, PLC

(57) ABSTRACT

Provided are: a compound resin containing a hydrogenated block copolymer (X) that is a hydrogenated product of a block copolymer having a polymer block (A) mainly composed of a structural unit derived from an aromatic vinyl compound and a polymer block (B) mainly composed of a structural unit derived from a conjugated diene compound, at least one terminal of which is formed of the polymer block (A), and an oil (Y) having a kinematic viscosity at 40° C. of 25 mm$^2$/s or less, the content of the oil (Y) relative to 100 parts by mass of the hydrogenated block copolymer (X) being 450 to 1,500 parts by mass; and a human body model containing the compound resin.

9 Claims, No Drawings

COMPOUND RESIN AND HUMAN BODY MODEL

TECHNICAL FIELD

The present invention relates to a compound resin and a human body model containing the compound resin.

BACKGROUND ART

A thermoplastic elastomer is molded and utilized as various buffers, damping materials, sealing materials, grips, adhesives, toys and others. Recently, further, by virtue of the texture thereof, use of a thermoplastic elastomer as internal organ models and human body models to be mounted on medical phantoms or medical simulators is now under investigation.

For example, PTL 1 discloses a hydrogenated block copolymer obtained through hydrogenation of a block copolymer obtained by reacting a living polymer having a predetermined structure and a coupling agent, and a thermoplastic elastomer composition containing the hydrogenated block copolymer and a softening agent for non-aromatic rubber and being excellent in flowability, compression set performance, flexibility and weather resistance. As use of the thermoplastic elastomer composition, medical use, artificial skin for testing, and the like are referred.

PTL 2 discloses a human body model of urethane, in which low-resilience urethane is used in the parts relatively softer than any other parts of a human body, such as breasts and buttocks, and rigid urethane is used in the other parts than the above so that the parts which are soft in actual human bodies are made to have a texture nearer to the texture of human bodies. Further, as human body models, mannequins and human body modes for medical training (palpation, nursing) are disclosed.

CITATION LIST

Patent Literature

PTL 1: WO2010/024382
PTL 2: JP 2015-112270 A

SUMMARY OF INVENTION

Technical Problem

In Examples in PTL 1, a high-viscosity oil (PW-32) is used as a softening agent for non-aromatic rubber for softening the thermoplastic elastomer composition. However, the composition becomes sticky after kneaded and becomes a hard composition, and therefore could not give a human skin-like texture, and for use for a human body model, improving the texture of the composition is desired. In addition, with the increase in the blending ratio of the oil in a thermoplastic elastomer, the composition becomes more difficult to knead, thereby resulting in a resin in which the thermoplastic elastomer is poorly dispersed.

PTL 2 says that the human body model of urethane described therein has a texture similar to that of an actual human body and has a skin-like texture. However, the specific gravity of polyurethane is 1.2 and is higher than that of human bodies or organs, and therefore, polyurethane could not reproduce the actual massive feeling of human bodies and organs.

In addition, in the case where human body models are used for exercise implements for medical practice or medical treatment, the human body models are repeatedly used and are therefore required to have improved durability.

The technical problem of the present invention is to provide a compound resin having a specific gravity near to that of human bodies and a texture near to human skins or organs, further having a high durability, and therefore being suitable for production of human body models, and to provide a human body model.

Solution to Problem

The present inventor has made assiduous studies and, as a result, has found that a compound resin prepared by blending a hydrogenated block copolymer having a specific structure with a predetermined oil in a predetermined amount can solve the above-mentioned problem.

The present invention relates to the following [1] to [8].
[1] A compound resin containing a hydrogenated block copolymer (X) that is a hydrogenated product of a block copolymer (X') having a polymer block (A) mainly composed of a structural unit derived from an aromatic vinyl compound and a polymer block (B) mainly composed of a structural unit derived from a conjugated diene compound, at least one terminal of which is formed of the polymer block (A), and an oil (Y) having a kinematic viscosity at 40° C. of 25 mm$^2$/s or less,
the content of the oil (Y) relative to 100 parts by mass of the hydrogenated block copolymer (X) being from 450 to 1,500 parts by mass.
[2] The compound resin according to the above [1], wherein the aromatic vinyl compound is styrene.
[3] The compound resin according to the above [1] or [2], wherein the conjugated diene compound is at least one selected from the group consisting of butadiene and isoprene.
[4] The compound resin according to any one of the above [1] to [3], wherein the oil (Y) is a paraffin-based process oil.
[5] The compound resin according to any one of the above [1] to [4], further containing a UV absorbent.
[6] A human body model containing the compound resin of any one of the above [1] to [5].
[7] The human body model according to the above [6], including at least one part selected from the group consisting of skins, fats, organs, muscles and blood vessels, which is formed of the compound resin.
[8] The human body model according to the above [6] or [7], which is for use for medical phantoms or for use for medical simulators.

Advantageous Effects of Invention

The compound resin of the present invention has a specific gravity near to that of human bodies, has a texture near to that of human skins or organs, and has high durability, and is therefore useful for development for use for human body models, especially for use for medical phantoms or as a pseudo-living organism material to be mounted on medical simulators.

DESCRIPTION OF EMBODIMENTS

[Compound Resin]
The compound resin of the present invention contains a hydrogenated block copolymer (X) that is a hydrogenated product of a block copolymer (X') having a polymer block (A) mainly composed of a structural unit derived from an aromatic vinyl compound and a polymer block (B) mainly composed of a structural unit derived from a conjugated diene compound, at least one terminal of which is formed of the polymer block (A), and an oil (Y) having a kinematic viscosity at 40° C. of 25 mm$^2$/s or less, wherein the content of the oil (Y) relative to 100 parts by mass of the hydrogenated block copolymer (X) is 450 to 1,500 parts by mass.

The compound resin of the present invention contains the above-mentioned specific hydrogenated block copolymer (X) and therefore expresses excellent elasticity and durability. In addition, since an oil (Y) in a predetermined amount relative to the hydrogenated block copolymer (X) is incorporated, the compound resin may have a specific gravity near to the specific gravity (about 1.0) of human bodies and can have a texture near to human skins and organs. Consequently, the human body model containing the compound resin of the present invention can faithfully realize both the specific gravity and the texture of actual human bodies.

In the compound resin, the content of the oil (Y) falls within a range of 450 to 1,500 parts by mass relative to 100 parts by mass of the hydrogenated block copolymer (X) and the texture of the compound resin can be thereby appropriately controlled, and accordingly, by using the compound resin of the present invention, a hard texture for outer skins of human bodies and a highly-elastic and soft texture for small intestines and large intestines can be reproduced.

<Hydrogenated Block Copolymer (X)>

The hydrogenated block copolymer (X) for use in the present invention is a hydrogenated product of a block copolymer (X') having a polymer block (A) mainly composed of a structural unit derived from an aromatic vinyl compound and a polymer block (B) mainly composed of a structural unit derived from a conjugated diene compound, at least one terminal of which is formed of the polymer block (A). The compound resin of the present invention contains the above-mentioned specific hydrogenated block copolymer (X), and therefore can form a compound resin having both flexibility and durability and having elastomer characteristics. Hereinafter, the polymer block (A) and the polymer block (B) to constitute the block copolymer (X') are described in order.

(Polymer Block (A))

The polymer block (A) is mainly composed of a structural unit derived from an aromatic vinyl compound. Here, "mainly composed of" means that the polymer block contains a structural unit derived from an aromatic vinyl compound in an amount of 50% by mass or more based on the total mass of the polymer block (A). The content of the structural unit derived from an aromatic vinyl compound in the polymer block (A) is, from the viewpoint of the transparency and the mechanical strength of the resultant compound resin, preferably 70% by mass or more based on the total mass of the polymer block (A), more preferably 90% by mass or more, and the upper limit is 100% by mass.

Examples of the aromatic vinyl compound include styrene, o-methylstyrene, m-methylstyrene, p-methylstyrene α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-, m- or p-bromomethylstyrene, silyl group-substituted styrene derivatives, indene, vinylnaphthalene, vinylanthracene, and N-vinylcarbazole.

Above all, from the viewpoint of the balance between production cost and physical properties, at least one selected from the group consisting of styrene and α-methylstyrene is preferred, and styrene is more preferred.

The polymer block (A) may contain a structural unit derived from any other unsaturated monomer than an aromatic vinyl compound as long as the object and the effects of the present invention are not inhibited. Examples of the other unsaturated monomer include at least one selected from butadiene, isoprene, 2,3-dimethyl-1,3-butadiene, 1,3-pentadiene, 1,3-hexadiene, isobutylene, methyl methacrylate, methyl vinyl ether, β-pinene, 8,9-p-menthene, dipentene, methylenenorbornene, and 2-methylenetetrahydrofuran. In the case where the polymer block (A) contains the other unsaturated monomer unit, the bonding mode may be, not specifically limited, any of a random bonding mode or a tapered bonding mode.

The content of the structural unit derived from the other unsaturated monomer than an aromatic vinyl compound in the polymer block (A) is, in general, based on the total mass of the polymer block (A), preferably 30% by mass or less, and more preferably 10% by mass or less.

Not specifically limited, the number-average molecular weight of the polymer block (A) is preferably 2,500 to 100,000, more preferably 5,000 to 50,000, even more preferably 5,000 to 40,000. The number-average molecular weight is a number-average molecular weight per one polymer block. The "number-average molecular weight" as referred to in this description is all a number-average molecular weight as converted in terms of a standard polystylene, which is measured through gel permeation chromatography (GPC).

The content of the polymer block (A) in the block polymer (X') is, from the viewpoint of tensile characteristics and flexibility, preferably 5 to 40% by mass, more preferably 10 to 35% by mass, even more preferably 15 to 35% by mass. The content of the polymer block (A) in the block polymer (X') is a value measured through $^1$H-NMR spectrometry. In the case where the block polymer (X') contains plural polymer blocks (A)'s, the "content of the polymer block (A)" is a total content of the plural polymer blocks (A)'s.

(Polymer Block (B))

The polymer block (B) is mainly composed of a structural unit derived from a conjugated diene compound. Here, "mainly composed of" means that the polymer block contains a structural unit derived from a conjugated diene compound in an amount of 50% by mass or more based on the total mass of the polymer block (B). The content of the structural unit derived from conjugated diene compound in the polymer block (B) is preferably 70% by mass or more based on the total mass of the polymer block (B), more preferably 90% by mass or more, and the upper limit is 100% by mass.

Examples of the conjugated diene compound to constitute the polymer block (B) include at least one selected from butadiene, isoprene, 2,3-dimethyl-1,3-butadiene, 1,3-pentadiene, and 1,3-hexadiene. Above all, at least one selected from butadiene and isoprene is preferred, and a mixture of butadiene and isoprene is more preferred. In the case where the conjugated diene compound to constitute the polymer block (B) is a mixture of butadiene and isoprene, the blending ratio thereof is, though not specifically limited, preferably such that the molar ratio of butadiene/isoprene falls within a range of 1/99 to 99/1, more preferably 10/90 to 90/10, even more preferably 30/70 to 70/30.

In the case where the polymer block (B) is formed of structural units derived from 2 or more kinds of conjugated diene compound (e.g., butadiene and isoprene), the bonding mode thereof is not specifically limited, and may be any of a random mode, a tapered mode, a complete alternate mode, a partial block mode, a block mode or a combination of two or more thereof.

Not specifically limited, the number-average molecular weight of the polymer block (B) is, from the viewpoint of the flexibility of the resultant compound resin, preferably 10,000 to 300,000, more preferably 20,000 to 270,000, and even more preferably 40,000 to 240,000. The number-average molecular weight is a number-average molecular weight per one polymer block.

In the polymer block (B), the content of the vinyl bond structural unit (for example, in the case of a butadiene monomer, the unit is a 1,2-bond structural unit, and in the case of a isoprene monomer, a total of a 1,2-bond structural unit and a 3,4-bond structural unit) is preferably 50 mol % or less. The content of the vinyl bond structural unit is more preferably 0 to 30 mol %, even more preferably 0 to 20 mol %, and further more preferably 0 to 10 mol %.

Further, the polymer block (B) may contain a structural unit derive from any other polymerizable monomer than a conjugated diene compound as long as the object and the effects of the present invention are not inhibited. Preferred examples of the other polymerizable monomer include at least one compound selected from aromatic vinyl compounds such as styrene, α-methyl styrene, o-methylstyrene, m-methylstyrene, p-methylstyrene, p-t-butylstyrene, 2,4-dimethylstyrene, vinylnaphthalene and vinyl anthracene, and methyl methacrylate, methyl vinyl ether, N-vinylcarbazole, β-pinene, 8,9-p-menthene, dipentene, methylnorbornene, and 2-methylenetetrahydrofuran. In the case where the polymer block (B) contains a structural unit derived from any other polymerizable monomer than a conjugated diene compound, the bonding mode is not specifically limited, and may be any of a random bonding mode or a tapered bonding mode.

The content of the structural unit derived from any other polymerizable monomer than a conjugated diene compound in the polymer block (B) is, in general, based on the total mass of the polymer block (B), preferably 30% by mass or less, more preferably 10% by mass or less.

The total content of the polymer block (A) and the polymer block (B) in the block polymer (X') is, from the viewpoint of attaining the effects of the present invention, preferably 70% by mass or more, more preferably 80% by mass or more, and even more preferably 90% by mass or more. The upper limit thereof is 100% by mass.

(Bonding Mode of Polymer Block (A) and Polymer Block (B))

The hydrogenated block copolymer (X) is a hydrogenation product of a block copolymer (X') having a polymer block (A) and a polymer block (B), in which one terminal is formed of the polymer block (A). When at least one terminal of the block copolymer (X') is formed of a polymer block (A), the compound resin produced using the hydrogenated block copolymer (X), a hydrogenation product of the block copolymer (X') can have an increased mechanical strength such as an increased tensile strength and therefore can faithfully reproduce the texture of human skins and organs. From the viewpoint of attaining the effect, more preferably, all the terminals of the block copolymer (X') are formed of a polymer block (A). For example, in the case where the block copolymer (X') is a linear block polymer, more preferably, both terminals thereof are formed of a polymer block (A).

In the case where the terminal of the block copolymer (X') is formed of the polymer block (B) alone, the resultant hydrogenated block copolymer is poorly compatible with the oil (Y) to be mentioned below, and therefore the texture of the resultant compound resin may tend to worsen since the compound resin could not sufficiently express the mechanical strength thereof.

In the block polymer (X'), the bonding mode between the polymer block (A) and the polymer block (B) is not specifically limited so far as they bond to each other according to the above-mentioned embodiment, that is, the bonding mode may be any of a linear bonding mode, a branched bonding mode, a radial bonding mode or a combination of two or more thereof. Above all, the bonding mode of the polymer block (A) and the polymer block (B) is preferably linear, and examples thereof include a triblock copolymer shown by A-B-A where A represents a polymer block (A) and B represents a polymer block (B), a tetrablock copolymer shown by A-B-A-B, a pentablock copolymer shown by A-B-A-B-A, and an (A-B)nZ-type copolymer (where Z represents a coupling agent residue, and n represents an integer of 3 or more). Above all, a triblock copolymer (A-B-A) is preferably employed from the viewpoint of easiness in production of the block copolymer and of the flexibility of the block copolymer.

Here in this description, in the case where the same kind of polymer blocks bond linearly to each other via a bifunctional coupling agent or the like, all the bonding polymer blocks are considered to be one polymer block. Accordingly, including the above-mentioned exemplifications, a polymer block that will have to be expressed naturally strictly as Q-Z-Q (where Z represents a coupling residue) is expressed as Q as a whole especially excepting the case where the polymer block need to be differentiated from a single polymer block Q. In this description, a polymer block of the type including a coupling agent residue is considered to be as mentioned above, and therefore, for example, a block copolymer that includes a coupling agent residue and is to be strictly expressed as A-B-Z-B-A (where Z represents a coupling agent residue) is expressed as A-B-A and is considered to be as one example of a triblock copolymer.

As long as the object of the present invention is not impaired, a block copolymer (C) of any other polymerizable monomer than the polymer block (A) and the polymer block (B) may exist in the block copolymer (X'). In this case where the polymer block (C) is expressed as C, examples of the structure of the block copolymer (X') include an A-B-C type triblock copolymer, an A-B-C-A type tetrablock copolymer and an A-B-A-C type tetrablock copolymer.

The hydrogenated block copolymer (X) for use in the compound resin of the present invention is a hydrogenated product of the above-mentioned block copolymer (X'). From the viewpoint of heat resistance and weather resistance, the hydrogenated block copolymer (X) is preferably such that 80 mol % or more of the carbon-carbon double bonds of the polymer block (B) in the block copolymer (X') are hydrogenated, and more preferably 90 mol % or more thereof are hydrogenated. The hydrogenation ratio is a value calculated from the content of the carbon-carbon double bonds in the structural unit derived from the conjugated diene compound in the polymer block (B) in $^1$H-NMR spectrometry before and after hydrogenation.

The number-average molecular weight of the hydrogenated block copolymer (X) is preferably 20,000 to 600,000, more preferably 35,000 to 400,000, and even more preferably 40,000 to 300,000. When the number-average molecular weight of the hydrogenated block copolymer (X) is 20,000 or more, the heat resistance of the resultant compound resin is good, while on the other hand, when it is 500,000 or less the molding workability of the compound resin is good.

The viscosity of the 5 mass % toluene solution at a temperature of 30° C. of the hydrogenated block copolymer (X) is preferably 1,000 mPa·s or less, more preferably within a range of 5 to 800 mPa·s, even more preferably 10 to 500 mPa·s. The viscosity of the 10 mass % toluene solution at a temperature of 30° C. thereof is preferably 50,000 mPa·s or less, more preferably within a range of 20 to 25,000 mPa·s, and even more preferably 10 to 10,000 mPa·s.

When the viscosity of the 5 mass % toluene solution at a temperature of 30° C. of the hydrogenated block copolymer (X) is 1,000 mPa·s or less, or when the viscosity of the 10 mass % toluene solution at a temperature of 30° C. thereof is 50,000 mPa·s or less, the molding workability of the resultant compound resin is good.

As long as the object and the effects of the present invention are not impaired, the hydrogenated block copolymer (X) may have, in the molecular chain and/or at the molecular terminal thereof, one or more functional groups such as a carboxy group, a hydroxy group, an acid anhydride group, an amino group or an epoxy group.

One kind alone of the hydrogenated block copolymer (X) may be used or two or more kinds thereof may be used in combination. The use of two or more kinds of hydrogenated block copolymers (X) in combination is preferred since, in the case, the viscosity of the resultant compound resin can be controlled and the molding workability thereof can be enhanced.

Commercially-available block copolymers may be used for the hydrogenated block copolymer (X). Preferred examples thereof include "Septon 1001", "Septon 1020", "Septon 2002", "Septon 2004", "Septon 2005", "Septon 2006, "Septon 2063", "Septon 2104", "Septon 4033", "Septon 4055", "Septon 4077", "Septon 4099", "Septon HG252", "Septon 8004", "Septon 8006", "Septon 8007" and "Septon 8076" (all trade names, by Kuraray Corporation).
(Method for Producing Hydrogenated Block Copolymer (X))

The block copolymer (X') before hydrogenation of the hydrogenated block copolymer (X) may be produced according to a solution polymerization method, an emulsion polymerization method or a solid-phase polymerization method. Above all, a solution polymerization method is preferred, and for example, any known method such as an ionic polymerization method of anionic polymerization or cationic polymerization or a radical polymerization method may be employable. Above all, an anionic polymerization method is preferred. In production of the hydrogenated block copolymer (X) according to an anionic polymerization method, for example, an aromatic vinyl compound and a conjugated diene compound may be added successively to a reactor in the presence of a solvent, an anionic polymerization initiator and optionally a Lewis base to give a block copolymer (x'), and then the block copolymer (X') may be hydrogenated to give the hydrogenated block copolymer (X).

An organic lithium compound may be used as a polymerization initiator in the above-mentioned method, and examples thereof include monolithium compounds such as methyl lithium, ethyl lithium, pentyl lithium, n-butyl lithium, sec-butyl lithium and tert-butyl lithium, and dilithium compounds such as tetraethylene dilithium.

With no specific limitation, the solvent may be any one not having any negative influence on anionic polymerization, and examples thereof include an aliphatic hydrocarbons such as cyclohexane, methylcyclohexane, n-hexane, and n-pentane, and aromatic hydrocarbons such as benzene, toluene and xylene. The polymerization is carried out generally at 0 to 100° C. for 0.5 to 50 hours.

The Lewis base has a role of controlling the microstructure of the structural unit derived from a conjugated diene compound. Examples of the Lewis base include dimethyl ether, diethyl ether, tetrahydrofuran, dioxane, ethylene glycol dimethyl ether, pyridine, N,N,N',N'-tetramethylethylenediamine, trimethylamine, and N-methylmorpholine. One kind alone of such Lewis bases may be used, or two or more kinds thereof may be used in combination.

After polymerization according to the above-mentioned method, the polymerization is stopped by adding an active hydrogen compound such as alcohols, carboxylic acids or water to the system, and the resultant product is hydrogenated in the presence of a hydrogenation catalyst in an inert organic solvent according to a known method to give a hydrogenated product, a hydrogenated block copolymer (X). As mentioned above, in the present invention, a hydrogenated block copolymer (X) is preferred in which 80 mol % or more of the carbon-carbon double bonds of the polymer block (B) in the block copolymer (X') have been hydrogenated.

The hydrogenation may be carried out in the presence of a hydrogenation catalyst under the condition of a reaction temperature of 20 to 100° C. and a hydrogen pressure of 0.1 to 10 MPa.

Examples of the hydrogenation catalyst include a Raney nickel; a heterogeneous catalyst of a metal such as platinum (Pt), palladium (Pd), ruthenium (Ru), rhodium (Rh), or nickel (Ni) supported by a carrier such as carbon, alumina or diatomaceous earth; a Ziegler catalyst of a combination of an organic metal compound of a Group 8 metal such as nickel or cobalt, and an organic aluminum compound or an organic lithium compound such as triethylaluminum or triisobutylaluminum; and a metallocene catalyst of a combination of a bis(cyclopentadienyl) compound of a transition metal such as titanium, zirconium or hafnium, and an organic metal compound of lithium, sodium, potassium, aluminum, zinc or magnesium.

The hydrogenated block copolymer (X) thus produced in the manner as above may be taken out through solidification by pouring the polymerization reaction liquid into methanol or the like followed by heating or drying under reduced pressure, or through so-called steam stripping for azeotropic solvent removal by pouring the polymerization reaction liquid into boiling water followed by heating or drying under reduced pressure.

<Oil (Y)>

The compound resin of the present invention contains an oil (Y) having a kinematic viscosity at 40° C. of 25 mm$^2$/s or less (hereinafter this may be simply referred to as "oil (Y)"). The oil has a kinematic viscosity at 40° C. of 25 mm$^2$/s or less, and therefore the compound resin produced by blending it is not sticky and has a texture near to that of human skins and, in addition, even when given tensile stress, the compound resin hardly breaks and has good shape restorability and high durability. In the case where an oil whose kinematic viscosity at 40° C. is more than 25 mm$^2$/s is used, the resultant compound resin could not have a texture near to that of human skins and the durability thereof lowers.

From the viewpoint of attaining the above-mentioned effects, the kinematic viscosity at 40° C. of the oil (Y) is preferably 20 mm$^2$/s or less, more preferably 15 mm$^2$/s or less, even more preferably 12 mm$^2$/s or less. The lower limit of the kinematic viscosity at 40° C. of the oil (Y) is not specifically limited, but is preferably 0.1 mm$^2$/s or more.

The kinematic viscosity at 40° C. of the oil may be measured according to the method of JIS K8803:2011.

Examples of the oil (Y) include mineral oils such as paraffinic process oil and a naphthenic process oil; vegetable oils such as peanut oil and rosin; aromatic oils; phosphate esters; low-molecular weight polyethylene glycol; liquid paraffin; and synthetic oils such as low-molecular weight ethylene, ethylene-α-olefin copolymer oligomer, liquid polybutene, liquid polyisoprene or hydrogenated products thereof, and liquid polybutadiene or hydrogenated products thereof. Among these, from the viewpoint of miscibility with the hydrogenated block copolymer (X), at least one selected from the group consisting of paraffinic process oil and naphthenic process oil is preferred, and paraffinic process oil is more preferred. One kind alone thereof may be used, or two or more kinds thereof may be used in combination.

The content of the oil (Y) in the compound resin of the present invention is 450 to 1,500 parts by mass relative to 100 parts by mass of the hydrogenated block copolymer (X). When the content of the oil (Y) in the compound resin is less than 450 parts by mass relative to 100 parts by mass of the hydrogenated block copolymer (X), the compound resin could not have a texture near to that of human skins, and the shape restorability thereof after extension of compound resin molded articles is poor. On the other hand, when the content of the oil (Y) is more than 1,500 parts by mass, the tensile durability of compound resin molded articles lowers. In addition, the resin moldability may also worsen.

From the above-mentioned viewpoints, the content of the oil (Y) in the compound resin is preferably 450 to 1,200 parts by mass relative to 100 parts by mass of the hydrogenated block copolymer (X), more preferably 500 to 1,100 parts by mass, even more preferably 600 to 1,000 parts by mass, and further more preferably 700 to 1,000 parts by mass.

The total content of the hydrogenated block copolymer (X) and the oil (Y) in the compound resin of the present invention is preferably 60% by mass or more, more preferably 70% by mass or more, even more preferably 80% by mass or more, and further more preferably 85% by mass or more. When the total content is 60% by mass or more, the effects of the present invention can be effectively expressed, and the moldability of the resultant compound resin is good. The upper limit of the total content is 100% by mass.

<Other Components>

As long as the effects of the present invention are not impaired, the compound resin of the present invention may contain, besides the above-mentioned hydrogenated block copolymer (X) and oil (Y), additives such as a UV absorbent, a light stabilizer, an antiaging agent, an antioxidant, a colorant, a filler and a crystal nucleating agent; hydrogenated resins such as a hydrogenated coumarone, an indene resin, a hydrogenated rosin resin, a hydrogenated terpene resin, and an alicyclic hydrogenated petroleum resin; tackifier resins such as an aliphatic resin of an olefin or diolefins polymer; and any other polymers such as a hydrogenated polyisoprene, a hydrogenated polybutadiene, a hydrogenated styrene-butadiene random copolymer, a hydrogenated styrene-isoprene random copolymer, a butyl rubber, a polyisobutylene and a polybutene.

Among the above, preferably, at least one additive selected from the group consisting of a UV absorbent, a light stabilizer, an antiaging agent, a colorant and a filler is preferably contained. In addition, from the viewpoint of the use thereof for human body models, the compound resin of the present invention preferably contains at least a UV absorbent, an antiaging agent and a colorant.

For preventing the molded articles from being deteriorated by UV rays, a UV absorbent may be contained in the compound resin of the present invention.

Though not specifically limited, examples of the UV absorbent include salicylate-based UV absorbents such as phenyl salicylate, p-t-butylphenyl salicylate, and p-octylphenyl salicylate; benzophenone-based UV absorbents such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl)methane; benzotriazole-based UV absorbents such as 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-4'-octoxyphenyl)benzotriazole, 2-[2'-hydroxy-3'-(3",4",5",6"-tetrahydrophthalimidomethyl)-5'-methylphenyl]benzo triazole, 2,2-methylenebis[4-(1,1,3,3-tetramethylbutyl)-6-(2H-benzotriazol-2-yl)phenol], 2-(2'-hydroxy-5'-methacryloxyphenyl)-2H-benzotriazole, and 2,2'-methylenebis[4-(1,1,3,3-tetramethylbutyl)-6-[(2H-benzotriazol-2-yl)phenol]; cyanoacrylate-based UV absorbents such as 2-ethylhexyl-2-cyano-3,3'-diphenyl acrylate, and ethyl-2-cyano-3,3'-diphenylacrylate; and nickel-based UV absorbents such as nickel bis(octylphenyl)sulfide, [2,2'-thiobis(4-t-octylphenolate)]-n-butylamine nickel, nickel complex-3,5-di-t-butyl-4-hydroxybenzyl-phosphate monoethylate, and nickel-dibutyldithiocarbamate.

One kind alone of these may be used, or two or more kinds thereof may be used in combination. Above all, as the UV absorbent, benzotriazole-based UV absorbents are preferred.

The amount of the UV absorbent to be added is generally within a range of 0.1 to 10% by mass in the compound resin, preferably 0.2 to 5% by mass.

Though not specifically limited, examples of the light stabilizer include hindered amine-based light stabilizers (HALS) such as bis(2,2,6,6-tetramethyl-4-piperidyl) sebacate, Sanol LS-770 (manufactured by Sankyo Co., Ltd.), Adekastab LA-77 (manufactured by ADEKA Corporation), Sumisorb 577 (manufactured by Sumitomo Chemical Co., Ltd.), Biosorb 04 (manufactured by Kyodo Chemical Co., Ltd.), Chimassorb 944LD (manufactured by BASF), Tinuvin 144 (manufactured by BASF), Adekastab LA-52, Adekastab LA-57, Adekastab LA-67, Adekastab LA-68, Adekastab LA-77, Adekastab LA-87 (all manufactured by ADEKA Corporation), and Goodrite UV-3034 (manufactured by Goodrich Corporation).

One kind alone of these may be used, or two or more kinds thereof may be used in combination.

The amount of the light stabilizer to be added is generally within a range of 0.1 to 5% by mass in the compound resin, preferably 0.2 to 3% by mass.

Also not specifically limited, examples of the antiaging agent include monophenol-based antiaging agents such as 2,6-di-t-butyl-p-cresol, butylated hydroxyanisole, 2,6-di-t-butyl-4-ethylphenol, and stearyl 13-(3,5-di-t-butyl-4-hydroxyphenyl)propionate; bisphenol-based antiaging agents such as 2,2-methylenebis(4-methyl-6-t-butylphenol), 2,2-methylenebis(4-ethyl-6-t-butylphenol), 4,4-thiobis(3-methyl-6-t-butylphenol), 4,4-butylidenebis(3-methyl-6-t-butylphenol), and 3,9-bis[1,1-dimethyl-2-[β-(3-t-butyl-4-hydroxy-5-methylphenyl)propionyloxy]ethyl 2,4,8,10-tetroxaspiro[5.5]undecane; high-molecular phenol-based antiaging agents such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[m ethylene-3-(3', 5'-di-t-butyl-4'-hydroxyphenyl)propionate]methane, bis[3, 3'-bis(4'-hydroxy-3'-t-butylphenyl)butyric acid]glycol ester, 1,3,5-tris(3',5'-di-t-butyl-4'-hydroxybenzyl)-S-triazine-2,4, 6-(1H,3H,5H)trione, and tocopherols; sulfur-based antiaging agents such as dilauryl 3,3'-thiodipropionate, dimyristyl 3,3'-thiodipropionate, and distearyl 3,3'-thiodipropionate; phosphorus-based antiaging agents such as triphenyl phosphite, diphenylisodecyl phosphite, phenyldiisodecyl phosphite, 4,4'-butylidene-bis(3-methyl-6-t-butylphenylditridecyl) phosphite, tris(nonylphenyl) phosphite, tris (dinonylphenyl) phosphite, diisodecylpentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl) phosphite, cyclic neopentanetetrayl bis(2, 4-di-t-butylphenyl)phosphite, cyclic neopentanetetrayl bis (2,6-di-t-butyl-4-methylphenyl)phosphite, and 2,2-methylenebis(4,6-di-t-butylphenyl)octyl phosphite; and phenol-phosphorus-based antiaging agents such as diethyl (3,5-di-t-butyl-4-hydroxybenzyl) phosphonate, ethyldi(3,5-di-t-butyl-4-hydroxybenzyl) phosphonate, and 6-[3-(3-t-butyl-4-hydroxy-5-methylphenyl)prop oxy]-2,4,8,10-tetra-t-butyldibenzo[d,f][1,3,2]dioxaphosphine.

As other antiaging agents, there are further mentioned poly(2,2,4-trimethyl-1,2-dihydroquinoline), 6-ethoxy-1,2-dihydro-2,2,4-trimethylquinoline, 1-(N-phenylamino)-naphthalene, styrenated diphenylamine, dialkyldiphenylamine, N,N'-diphenyl-p-phenylenediamine, N-phenyl-N'-isopropyl-p-phenylenediamine, N,N'-di-2-naphthyl-p-phenylenediamine, 2-mercaptobenzimidazole, 2-mercaptobenzimidazole zinc salt, 2-mercaptomethylbenzimidazole, nickel dibutyldithiocarbamate, Sunnoc (manufactured by Ouchi Shinko Chemical Industrial Co., Ltd.), Suntight (manufactured by Seiko Chemical Co., Ltd.), and Ozoguard G (manufactured by Kawaguchi Chemical Industry Co., Ltd.).

One kind alone of these may be used, or two or more kinds thereof may be used in combination. Above all, as the antiaging agent, phenol-phosphorus-based antiaging agents are preferred.

The amount of the antiaging agent to be added is generally within a range of 0.1 to 10% by mass in the compound resin, preferably 0.5 to 5% by mass.

For the colorant, pigments and dyes may be appropriately selected in accordance with the use and the coloration purpose. From the viewpoint of weather resistance, pigments are preferred. As the pigments, any of organic pigments and inorganic pigments may be used.

In the case where the compound resin of the present invention is used for human body models, for example, a skin color pigment may be contained.

The amount of the colorant to be added is generally within a range of 0.01 to 10% by mass in the compound resin, and preferably 0.1 to 5% by mass, and one kind alone may be used, or two or more kinds may be used in combination.

Though not specifically limited, examples of the filler include reinforcing fillers such as wood powder, pulp, cotton chips, asbestos, glass fibers, carbon fibers, mica, walnut shell powder, rice hull powder, graphite, diatomaceous earth, white clay, silica (e.g., fumed silica, precipitated silica, crystalline silica, molten silica, dolomite, anhydrous silicic acid, hydrous silicic acid), and carbon black; fillers such as calcium carbonate, magnesium carbonate, diatomaceous earth, calcined clay, clay, talc, titanium oxide, bentonite, organic bentonite, ferric oxide, red iron oxide, aluminum fine powder, flint powder, zinc oxide, active zinc oxide, zinc powder, zinc carbonate, and shirasu balloons; and fibrous fillers such as asbestos, glass fibers and glass filaments, carbon fibers, Kevlar fibers, and polyethylene fibers. Among the above, calcium carbonate is preferred.

One kind alone of these may be used, or two or more kinds thereof may be used in combination.

The amount of the filler to be added is generally within a range of 0.1 to 15% by mass in the compound resin, and preferably 0.5 to 10% by mass.

The specific gravity at 25° C. of the compound resin of the present invention is, from the viewpoint of providing human body models having a massive feeling near to that of human bodies, preferably 0.85 to 1.05, more preferably 0.85 to 1.00, even more preferably 0.85 to 0.95. The specific gravity of the compound resin may be measured according to the method of JIS Z8807:2012.

<Method for Producing Compound Resin>

The method for producing the compound resin of the present invention is not specifically limited, for which the above-mentioned hydrogenated block copolymer (X) and oil (Y), and optionally additives may be melted and kneaded using a kneading apparatus such as a mixing roll, a kneader, a Banbury mixer, a Brabender mixer, or a single-screw or twin-screw extruder. In general, the kneading may be carried out at 100 to 250° C.

After melted and kneaded as above, the resultant blend may be molded according to a known method to give a molded article of the compound resin of the present invention. Not specifically limited, the molding method may be appropriately selected depending on the size and the shape of the article to be molded. For example, a molding method of injection molding, compression molding, extrusion molding, cast molding or press molding may be employed.

<Use>

The compound resin of the present invention is favorable for human body models to be mentioned hereinunder, and based on the elastomer characteristics and durability thereof, the compound resin may also be used for other uses. For example, it may be effectively used in a wide range including buffers, damping materials, sealing materials, adhesive materials, heat radiation materials, sealing materials, flexible materials, heat insulating materials, soundproof materials, sound insulating materials, light guide materials, wrapping materials, shoes, jackets, protectors, helmets, prostheses, artificial legs, mats, pads, beds, mattresses, pillows, wheelchairs, child sheets, baby cars, mobile phones, digital cameras, personal computers, game machines, navigation systems, house electric appliances, electric tools, industrial equipments, robots, automobiles, ships, aircrafts, motors, generators, solar cells, optical fiber cables, optical fiber connectors, furniture, stationery, toys, insoles for shoes, window frames, candles, and artificial foods.

[Human Body Model]

The human body model of the present invention is characterized by containing the above-mentioned compound resin of the present invention. The compound resin has a specific gravity near to that of human bodies, and has a texture near to that of human skins and organs, and further has high durability, and is therefore favorably used for human body models.

The human body model of the present invention may be entirely formed of the compound resin of the present invention, or a part thereof may be formed of the compound resin of the present invention. The human body model referred to in this description is not limited to an entire human body but includes models human body parts.

In particular, the compound resin of the present invention has a texture near to that of human skins or organs, and therefore, the human body model of the present invention is preferably one that includes at least one part selected from the group consisting of skins, fats, organs, muscles and blood vessels formed of the compound resin of the present invention.

The method for producing the human body model is not specifically limited, and for example, the compound resin produced according to the above-mentioned method may be molded using a casting mold having a desired shape to give the intended human body model.

The human body model of the present invention has a texture and a massive feeling nearer to those of human bodies, and has higher durability, and is therefore favorable for a human body model for medical phantoms or medical simulators.

EXAMPLES

Hereinunder the present invention is described more specifically with reference to Examples, but the present invention is not limited to these Examples. The physical properties in Examples and Comparative Examples were measured and evaluated according to the methods mentioned below.

<Hydrogenation Ratio, Content of Styrene-Derived Structural Unit>

Measured through 1H-NMR.
Apparatus: Nuclear magnetic resonator "Lambda-500" (manufactured by JEOL Ltd.)
Solvent: Deuterated chloroform
<Viscosity of Oil (40° C.)>

The kinematic viscosity ($mm^2/s$) of oil at 40° C. was measured according to the method of JIS K8803:2011.
<Specific Gravity>

The specific gravity of the compound resin obtained in each example was measured at 25° C. according to the method of JIS Z8807:2012.
<Moldability>

An injection-molded sheet (width×length×thickness was 100 mm×30 mm×1 mm) of the compound resin obtained in each example was sampled and the sample surface of width×length was observed to check for the presence or absence of craters therein to evaluate the sheet.

The moldability evaluation standards are as follows.
A: No crater (good surface).
B: 1 to 3 craters.
C: 4 or more craters.

<Tensile Durability Test>

An injection-molded sheet (width×length×thickness was 100 mm×30 mm×1 mm) of the compound resin obtained in each example was sampled. This was first elongated until the width thereof could reach 200 mm (200% elongation), and then restored to the original state for one operation. This operation was repeated 100 times, 300 times and 500 times, whereupon the sample was checked for the presence or absence of breaking and the elongated with of the sample was measured. For the evaluation results, the data of three samples of each sheet were averaged to give an average value.

Evaluation standards for total evaluation are as follows.
A: After tested repeatedly 500 times, the elongated width of the sample was 0.1 mm or less.
B: After tested repeatedly 500 times, the elongated width of the sample was more than 0.1 mm and 0.2 mm or less.
C: After tested repeatedly 500 times, the elongated width of the sample was more than 0.2 mm and 0.3 mm or less.
D: After tested repeatedly 500 times, the elongated width of the sample was more than 0.3 mm.

<Shape Restoration Test>

An injection-molded sheet (width×length×thickness was 100 mm×30 mm×1 mm) of the compound resin obtained in each example was sampled. This was elongated by 150% (150 mm) and 200% (200 mm) relative to the width 100 mm, then kept as such for 48 hours, and thereafter restored to the original size, and the sample width was measured. For the evaluation results, the data of three samples of each sheet were averaged to give an average value. Evaluation standards are as follows.

A: 100 mm (original state).
B: More than 100 mm and 105 mm or less (the elongated width was within 5 mm).
C: More than 105 mm (the elongated width was more than 5 mm).

<Organoleptic Evaluation>

An injection-molded sheet (width×length×thickness was 100 mm×30 mm×1 mm) of the compound resin obtained in each example was organoleptically evaluated for the following 3 points. For the organoleptic evaluation, the evaluation scores of 10 monitors were aggregated and averaged, and the resultant average values were the evaluation results.

The evaluation scores are as follows:
Extremely excellent (5 points), excellent (4 points), average (3 points), not so good (2 points), not good (1 point).
(Human Skin-Like Feeling)

The injection-molded sheet was pushed with the finger to evaluate as to whether the repulsive force could be near to that to human skins.
(Outward Appearance)

A skin color pigment was incorporated into the sheet, which was evaluated in point of coloration.
(Elongation)

The sheet was elongated up to 200% and evaluated in point of elongability. Among the above, the evaluation of "human skin-like feeling" is important. For the evaluation of human skin-like feeling, a score of 4.0 points or more is a good score.

[Compound Resin Materials Used in Examples]

Details of the components used in each example are shown below.

[Hydrogenated Block Copolymer (X)]

Septon 4055 (trade name), manufactured by Kuraray Corporation, a hydrogenated triblock copolymer of a hydrogenated product of polystyrene-poly(1,3-butadiene/isoprene)-polystyrene [styrene-derived polymer block content: 30% by mass], 5 mass % toluene solution viscosity (30° C.): 90 mPa·s.

Septon 4033 (trade name), manufactured by Kuraray Corporation, a hydrogenated triblock copolymer of a hydrogenated product of polystyrene-polyisoprene-polystyrene [styrene-derived polymer block content: 30% by mass], 10 mass % toluene solution viscosity (30° C.): 50 mPa·s.

Septon 4077 (trade name), manufactured by Kuraray Corporation, a hydrogenated triblock copolymer of a hydrogenated product of polystyrene-poly(1,3-butadiene/isoprene)-polystyrene [styrene-derived polymer block content: 30% by mass], 5 mass % toluene solution viscosity (30° C.): 300 mPa·s.

Septon 4099 (trade name), manufactured by Kuraray Corporation, a hydrogenated triblock copolymer of a hydrogenated product of polystyrene-poly(1,3-butadiene/isoprene)-polystyrene [styrene-derived polymer block content: 30% by mass], 5 mass % toluene solution viscosity (30° C.): 670 mPa·s.

[Oil (Y)]

CARNATION (trade name), manufactured by Sonneborn LLC, paraffinic process oil, kinematic viscosity (40° C.): 11 $mm^2/s$.

KF-50 (trade name), manufactured by SEOJIN CHEMICAL Corporation, paraffinic process oil, kinematic viscosity (40° C.): 7.5 $mm^2/s$.

PW-32 (trade name), manufactured by Idemitsu Kosan Co., Ltd., paraffinic process oil, kinematic viscosity (40° C.): 30 $mm^2/s$.

PW-90 (trade name), manufactured by Idemitsu Kosan Co., Ltd., paraffinic process oil, kinematic viscosity (40° C.): 90 $mm^2/s$.

Example 1: (Production of Compound Resin and Molded Article Thereof)

Using a twin-screw extruder (caliber 46 mm, L/D=46), a hydrogenated block copolymer (X) and an oil (Y) in the blend ratio shown in Table 1, and as additives, a UV absorbent, a light stabilizer, an antiaging agent, a filler (calcium carbonate) and a pigment were mixed, then melted and kneaded at 200° C. to give a compound resin. The total amount of the additives was 10% by mass of the compound resin.

Using an injection-molding machine (200° C.), the compound resin was molded in a mold to have a size of 100 mm in width, 30 mm in length, and 1 mm in thickness, thereby producing an injection-molded sheet.

The produced sheet was evaluated in the manner mentioned above. The results are shown in Table 1.

Examples 2 to 13 and Comparative Examples 1 to 6

Compound resins and injection-molded sheets were produced according to the same method as in Example 1 except that the blend ratio of the hydrogenated block copolymer (X) and the oil (Y) were changed as in Table 1, and evaluated in the manner mentioned above. The results are shown in Table 1.

Comparative Example 7

A silicone resin manufactured by Wacker Asahikasei Silicone Co., Ltd. was molded in a mold to have a size of width×length×thickness of 100 mm×30 mm×1 mm, thereby producing an injection-molded sheet. The produced sheet was evaluated in the manner mentioned above. The results are shown in Table 1.

Comparative Example 8

An urethane resin manufactured by H & K Ltd. was molded in a mold to have a size of width×length×thickness of 100 mm×30 mm×1 mm, thereby producing an injection-molded sheet. The produced sheet was evaluated in the manner mentioned above. The results are shown in Table 1.

Comparative Example 9

A soft vinyl chloride resin manufactured by Kobayashi & Co., Ltd. was molded in a mold to have a size of width× length×thickness of 100 mm×30 mm×1 mm, thereby producing an injection-molded sheet. The produced sheet was evaluated in the manner mentioned above. The results are shown in Table 1.

TABLE 1

| | Compound Resin | | | | | | | |
|---|---|---|---|---|---|---|---|---|
| | Block Copolymer (X) | | Oil (Y) | | | | Tensile Durability Test | |
| | Kind | Blended Amount (part by mass) | Kind | Viscosity (40° C.) $mm^2/s$ | Blended Amount (part by mass) | Specific Gravity (25° C.) | Moldability | 100 times | 300 times |
| Example 1 | 4055 | 100 | CARNATION | 11.0 | 450 | 0.92 | B | 0.0 mm | 0.0 mm |
| Example 2 | 4055 | 100 | CARNATION | 11.0 | 600 | 0.90 | B | 0.0 mm | 0.0 mm |
| Example 3 | 4055 | 100 | CARNATION | 11.0 | 700 | 0.90 | A | 0.0 mm | 0.0 mm |
| Example 4 | 4055 | 100 | CARNATION | 11.0 | 1000 | 0.90 | A | 0.0 mm | 0.0 mm |
| Example 5 | 4033/4055 | 20/80 | CARNATION | 11.0 | 1000 | 0.90 | A | 0.0 mm | 0.0 mm |
| Example 6 | 4033/4055 | 35/65 | CARNATION | 11.0 | 1000 | 0.90 | B | 0.0 mm | 0.1 mm |
| Example 7 | 4077/4055 | 20/80 | CARNATION | 11.0 | 1000 | 0.90 | A | 0.0 mm | 0. mm |
| Example 8 | 4099/4055 | 20/80 | CARNATION | 11.0 | 1000 | 0.90 | B | 0.0 mm | 0.1 mm |
| Example 9 | 4055 | 100 | CARNATION | 11.0 | 1100 | 0.90 | B | 0.0 mm | 0.1 mm |
| Example 10 | 4055 | 100 | CARNATION | 11.0 | 1500 | 0.90 | B | 0.0 mm | 0.1 mm |
| Example 11 | 4055 | 100 | KF-50 | 7.5 | 700 | 0.89 | A | 0.0 mm | 0.0 mm |
| Example 12 | 4055 | 100 | KF-50 | 7.5 | 1000 | 0.89 | A | 0.0 mm | 0.0 mm |
| Example 13 | 4055 | 100 | KF-50 | 7.5 | 1500 | 0.88 | B | 0.0 mm | 0.0 mm |
| Comparative Example 1 | 4055 | 100 | CARNATION | 11.0 | 350 | 0.92 | C | 0.0 mm | 0.0 mm |

TABLE 1-continued

| | | | | | | | | | |
|---|---|---|---|---|---|---|---|---|---|
| Comparative Example 2 | 4055 | 100 | CARNATION | 11.0 | 2000 | 0.88 | C | 0.1 mm | 0.2 mm |
| Comparative Example 3 | 4055 | 100 | PW-32 | 30.0 | 700 | 0.90 | C | 0.0 mm | 0.1 mm |
| Comparative Example 4 | 4055 | 100 | PW-32 | 30.0 | 1000 | 0.90 | C | 0.0 mm | 0.2 mm |
| Comparative Example 5 | 4055 | 100 | PW-90 | 90.0 | 700 | 0.91 | C | 0.0 mm | 0.1 mm |
| Comparative Example 6 | 4055 | 100 | PW-90 | 90.0 | 1000 | 0.91 | C | 0.0 mm | 0.2 mm |
| Comparative Example 7 | Silicone Resin | | | — | | 1.20 | C | 0.3 mm | 0.5 mm |
| Comparative Example 8 | Urethane Resin | | | — | | 1.20 | C | 0.5 mm | broken |
| Comparative Example 9 | Soft Vinyl Chloride Resin | | | — | | 1.30 | C | broken | — |

| | Tensile Durability Test | | Shape Restorability Test | | Organoleptic Evaluation | | |
|---|---|---|---|---|---|---|---|
| | 500 times | Comprehensive Evaluation | 150% Elongation | 200% Elongation | Human Skin-Like Feeling | Appearance | Elongability |
| Example 1 | 0.1 mm | A | A | A | 4.2 | 4.6 | 4.5 |
| Example 2 | 0.1 mm | A | A | A | 4.4 | 4.6 | 5.0 |
| Example 3 | 0.1 mm | A | A | A | 4.5 | 4.6 | 5.0 |
| Example 4 | 0.1 mm | A | A | A | 4.5 | 4.6 | 5.0 |
| Example 5 | 0.1 mm | A | A | A | 4.5 | 4.6 | 5.0 |
| Example 6 | 0.2 mm | B | A | B | 4.2 | 4.6 | 4.5 |
| Example 7 | 0.1 mm | A | A | A | 4.3 | 4.6 | 5.0 |
| Example 8 | 0.2 mm | B | B | B | 4.0 | 4.6 | 4.5 |
| Example 9 | 0.2 mm | B | A | A | 4.5 | 4.6 | 5.0 |
| Example 10 | 0.2 mm | B | A | A | 4.5 | 4.6 | 5.0 |
| Example 11 | 0.1 mm | A | A | A | 4.5 | 4.6 | 5.0 |
| Example 12 | 0.2 mm | B | A | A | 4.5 | 4.6 | 5.0 |
| Example 13 | 0.2 mm | B | A | A | 4.5 | 4.6 | 5.0 |
| Comparative Example 1 | 0.1 mm | A | B | B | 3.5 | 4.6 | 4.0 |
| Comparative Example 2 | 0.4 mm | D | A | A | 4.0 | 4.6 | 5.0 |
| Comparative Example 3 | 0.2 mm | B | A | B | 3.5 | 3.7 | 4.0 |
| Comparative Example 4 | 0.3 mm | C | A | B | 3.9 | 3.7 | 4.5 |
| Comparative Example 5 | 0.2 mm | B | A | B | 3.5 | 3.7 | 4.0 |
| Comparative Example 6 | 0.3 mm | C | A | B | 3.9 | 3.7 | 4.5 |
| Comparative Example 7 | 0.6 mm | D | B | B | 3.9 | 3.7 | 4.0 |
| Comparative Example 8 | — | — | C | C | 3.5 | 2.3 | 3.0 |
| Comparative Example 9 | — | — | C | C | 1.0 | 3.7 | 1.0 |

As shown in Table 1, the molded articles (sheets) of the compound resin of the present invention have high tensile durability, and the shape restorability after elongation thereof is good, and the texture and the appearance thereof are near to those of human skins (Examples 1 to 13). In particular, as compared with the silicone resin, the urethane resin and the soft vinyl chloride resin (Comparative Examples 7 to 9) heretofore used for human body models, the effects thereof are remarkable. The resins of Comparative Examples 7 to 9 have a specific gravity far higher than that of human skins, and the organoleptic evaluation thereof is poor.

In Comparative Example 1 where the content of the oil (Y) relative to 100 parts by mass of the hydrogenated block copolymer (X) is less than 450 parts by mass, the shape restorability and the human skin-like feeling are not good, and in Comparative Example 2 where the content of the oil (Y) is more than 1,500 parts by mass, the tensile durability is poor. In Comparative Examples 3 to 6 where the viscosity of the oil is high, the tensile durability and the shape restorability after 200% elongation are not good, and the organoleptic evaluation such as human skin-like feeling is lower than that in Examples.

INDUSTRIAL APPLICABILITY

The compound resin of the present invention has a specific gravity near to that of human bodies, has a texture near to that of human skins and organs, and has high durability, and is therefore developable to use for human body models, especially for use for medical phantoms or as a pseudo-living organism material to be mounted on medical simulators.

The invention claimed is:

1. A human body model, comprising:
   a compound resin containing
   a hydrogenated block copolymer (X) that is a hydrogenated product of a block copolymer (X') having a polymer block (A) mainly comprising a structural unit derived from an aromatic vinyl compound and a polymer block (B) mainly comprising a structural unit derived from a conjugated diene compound, at least one terminal of which is formed of the polymer block (A), and
   an oil (Y) having a kinematic viscosity at 40° C. of 25 mm$^2$/s or less, wherein
   a content of the oil (Y) relative to 100 parts by mass of the hydrogenated block copolymer (X) ranges from 700 to 1,500 parts by mass, and
   the compound resin has a specific gravity of 0.85 to 1.05 at 25° C.

2. The human body model according to claim 1, comprising at least one part selected from the group consisting of skins, fats, organs, muscles, and blood vessels, which comprises the compound resin.

3. The human body model according to claim 1, which is suitable for medical phantoms or for medical simulators.

4. The human body model according to claim 1, wherein the aromatic vinyl compound is styrene.

5. The human body model according to claim 1, wherein the conjugated diene compound is at least one selected from the group consisting of butadiene and isoprene.

6. The human body model according to claim 1, wherein the oil (Y) is a paraffin-based process oil.

7. The human body model according to claim 1, wherein the compound resin further contains a UV absorbent.

8. The human body model according to claim 1, wherein the conjugated diene compound contains isoprene.

9. The human body model according to claim 1, wherein the polymer block (B) comprises structural units derived from two or more kinds of conjugated diene compounds.

* * * * *